(12) United States Patent
Ardite et al.

(10) Patent No.: US 12,229,193 B2
(45) Date of Patent: *Feb. 18, 2025

(54) SEARCH SYSTEMS AND METHODS UTILIZING SEARCH BASED USER CLUSTERING

(71) Applicant: OPEN TEXT SA ULC, Halifax (CA)

(72) Inventors: Jaime Ayats Ardite, Terrassa (ES); Todd Russell Poston, Dallas, TX (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,810

(22) Filed: Nov. 22, 2022

(65) Prior Publication Data
US 2023/0086966 A1 Mar. 23, 2023

Related U.S. Application Data

(63) Continuation of application No. 16/891,837, filed on Jun. 3, 2020, now Pat. No. 11,556,590, which is a continuation of application No. 15/991,521, filed on May 29, 2018, now Pat. No. 10,706,107.

(60) Provisional application No. 62/512,207, filed on May 30, 2017.

(51) Int. Cl.
| G06F 16/9032 | (2019.01) |
| G06F 16/28 | (2019.01) |
| G06F 16/432 | (2019.01) |
| G06F 16/9535 | (2019.01) |

(52) U.S. Cl.
CPC ...... *G06F 16/90324* (2019.01); *G06F 16/285* (2019.01); *G06F 16/432* (2019.01); *G06F 16/9535* (2019.01)

(58) Field of Classification Search
None
See application file for complete search history.

(56) References Cited

U.S. PATENT DOCUMENTS

| 8,316,019 | B1* | 11/2012 | Ainslie | G06F 16/90324 707/733 |
| 8,364,709 | B1* | 1/2013 | Das | G06F 16/90335 707/780 |
| 8,392,435 | B1* | 3/2013 | Yamauchi | G06F 16/90324 707/768 |
| 2006/0259480 | A1* | 11/2006 | Zhang | G06F 16/9558 707/999.005 |
| 2008/0243833 | A1* | 10/2008 | Wang | G06F 16/36 707/999.005 |
| 2012/0166466 | A1* | 6/2012 | Slater | G16H 10/60 707/E17.074 |
| 2012/0317106 | A1* | 12/2012 | Akiyama | G06F 16/9535 707/730 |
| 2013/0031470 | A1* | 1/2013 | Daly, Jr. | G06F 40/103 715/243 |

(Continued)

*Primary Examiner* — Christopher J Raab
(74) *Attorney, Agent, or Firm* — Sprinkle IP Law Group

(57) ABSTRACT

Embodiments of search systems that leverage the search or access activities of a core group of users to improve search functionality and performance of such search systems are disclosed. Specifically, embodiments may utilize users' search activity to generate clusters of users and associated labels for those clusters. These clusters can be leveraged during a search to generate suggestions for a user conducting the search.

21 Claims, 7 Drawing Sheets

(56) References Cited

U.S. PATENT DOCUMENTS

| | | | |
|---|---|---|---|
| 2013/0254190 A1* | 9/2013 | Nakano | G06F 16/3322 |
| | | | 707/727 |
| 2016/0179945 A1* | 6/2016 | Lastra Diaz | G06F 16/284 |
| | | | 707/739 |
| 2017/0192991 A1* | 7/2017 | Touma | G06F 16/3322 |
| 2018/0137137 A1* | 5/2018 | Jin | G06F 16/90324 |

* cited by examiner

FIG. 5

| CAMPAIGN 502 | | SIZE 504 | 156 | 115 | 154 |
|---|---|---|---|---|---|
| | | 506 | 512 | | 514 |
| | | 508 | | | |
| | | 510 | | | |
| GRAPHICS SOLUTIONS 520 | | SIZE | 156 | 115 | 154 |
| | | LABEL2 | LIFESTYLE | LIFESTYLE | LIFESTYLE |
| | | LABEL3 | ABSTRACTION | ABSTRACTION | ABSTRACTION |
| | | LABEL4 | HP SERVERS | HP SERVERS | CONSUMER PC |
| | | SIZE | 111 | 88 | 94 |
| | | LABEL2 | LIFESTYLE | LIFESTYLE | LIFESTYLE |
| | | LABEL3 | ABSTRACTION | ABSTRACTION | ABSTRACTION |
| | | LABEL4 | HP NETWORKING | HP NETWORKING | HP NETWORKING |
| INKJET AND PRINTING SOLUTIONS | | SIZE | 133 | 115 | 124 |
| | | LABEL2 | LIFESTYLE | LIFESTYLE | LIFESTYLE |
| | | LABEL3 | LaserJet AND ENTERPRISE SOLUTIONS | COMMERCIAL PC CLIENTS | CONSUMER PC CLIENTS |
| | | LABEL4 | CONSUMER PC CLIENTS | CONSUMER PC CLIENTS | LaserJet AND ENTERPRISE SOLUTIONS |
| LIFESTYLE | | SIZE | 438 | 346 | 354 |
| | | LABEL2 | ABSTRACTION | ABSTRACTION | ABSTRACTION |
| | | LABEL3 | COMMERCIAL PC | COMMERCIAL PC | COMMERCIAL PC |
| | | LABEL4 | HP SERVERS | HP SERVERS | HP SERVERS |
| LaserJet AND ENTERPRISE SOLUTIONS | | SIZE | 115 | 102 | 104 |
| | | LABEL2 | INKJET AND PRINTING SOLUTIONS | INKJET AND PRINTING SOLUTIONS | INKJET AND PRINTING SOLUTIONS |
| | | LABEL3 | LIFESTYLE | LIFESTYLE | LIFESTYLE |
| | | LABEL4 | OTHER IPG | COMMERCIAL PC CLIENTS | COMMERCIAL PC CLIENTS |

500

| | | | | |
|---|---|---|---|---|
| CAMPAIGN 602 | SUG 1 606 | TABO 616 | TABO | POCHACCO |
| | SUG 2 608 | POCHACCO 618 | BOSCO | TABO |
| | SUG 3 610 | BOSCO 620 | POCHACCO | BOSCO |
| | SUG 4 612 | KOWALSKI 622 | KOWALSKI | KOWALSKI |
| | SUG 5 614 | REACHER 624 | PETRUS | PETRUS |
| GRAPHICS SOLUTIONS 604 | SUG 1 | Z6200 | T790 | FB10000 |
| | SUG 2 | FB10000 | WALLART | Z5200 |
| | SUG 3 | T790 | T795 | T1300 |
| | SUG 4 | T1300 | 6800 | WALLART |
| | SUG 5 | Z5200 | PHOTOBOOK | SUPERMARKET |
| INKJET AND PRINTING SOLUTIONS | SUG 1 | 950XL | 6830 | 8610 |
| | SUG 2 | X476 | 8610 | X576DW |
| | SUG 3 | 8610 | X476 | OFFICEJET PRO 861 |
| | SUG 4 | 951XL | 7612 | ENVY 7640 |
| | SUG 5 | X476DN | 6230 | X476 |
| LIFESTYLE | SUG 1 | WINNER | RECOGNITION | FUTURE |
| | SUG 2 | SPRING | LEADER | WINNER |
| | SUG 3 | RECOGNITION | FIREWORKS | RECOGNITION |
| | SUG 4 | LEADER | SKYSCRAPPER | SPRING |
| | SUG 5 | CROWD | BASKETBALL | LEADER |
| LaserJet AND ENTERPRISE SOLUTIONS | SUG 1 | CE278A | X585Z | M201 |
| | SUG 2 | M201 | M401 | M225 |
| | SUG 3 | 476 | M680F | X585Z |
| | SUG 4 | CE285A | M201DW | M476DN |
| | SUG 5 | CC533A | M630F | M630F |

| | 700 706 708 |
|---|---|
| PRODUCT AND PRODUCT IN USE 702 | {u'h7000': 1, u'6830': 1, u'm476dw': 1, u'980': 1, u'headphone': 1, u'M127fm': 1, u'headphone': 1, u'8610': 1, u'dl360p': 1, u'z620': 1, u'sport': 1, u'950': 1, u'chromebook': 1, u'headset': 1, u'Phelps': 1, u'space': 1, u'chrome': 1, u'sun': 1, u'c3000': 1, u's6000': 1, u'P1102w': 1, u'DL580': 1, u'split': 1, u'05a': 1, u'DL360': 1, u'364': 1, u'meeting': 1, u'Nonstop': 1, u'C7000': 1, u'6820': 1, u'x360': 1, u'coffee': 1, u'T920': 1, u'dl380p': 1, u'z5400': 1, u'301': 1, u'CP1025': 1, u'RDX': 1, u'Z6200': 1, u'M176n': 1, u'5530': 1, u'm177fw': 1, u't7100': 1, u'W2072a': 1, u'x476dw': 1, u'T520': 1, u'elitepad': 1, u'z1': 1, u'Z420': 1, u'Z230': 1, u'X576dw': 1, u'Zbook': 1, u'X451dw': 1, u'z3200': 1, u'M1536dnf': 1, u'M276': 1, u'headphones': 1, u't 1500': 1, u'4645': 1, u'951': 1, u'1200w': 1, u'Slate7': 1, u'7400': 1, u'5525': 1} |
| LIFESTYLE 704 | {u'summer': 1, u'bicycle': 1, u'crowd': 1, u'repair': 1, u'money': 1, u'africa': 1, u'community': 1, u'finance': 1, u'basketball': 1, u'police': 1, u'Emergency': 1, u'factory': 1, u'bike': 1, u'safety': 1, u'nurse': 1, u'soccer': 1, u'easter': 1, u'highway': 1, u'stock': 1, u'garden': 1, u'fire': 1, u'football': 1, u'traffic': 1, u'Team': 1, u'Businessman': 1, u'law': 1, u'lobby': 1, u'bank': 1, u'dubai': 1, u'workshop': 1, u'banking': 1, u'dream': 1} |
| CAMPAIGN | {u'msa 2040': 1, u'2143003': 1, u'8600': 1, u'StoreOnce': 1, u'368882': 1, u'M575': 1, u'O-8468H': 1, u'2144003': 1, u'oneview': 1, u'BURA': 1, u'2144002': 1, u'newsletter': 1, u'476': 1, u'4132002': 1, u'250685': 1, u'puma': 1, u'z820': 1, u'Risk': 1, u'2545': 1, u'X576': 1, u'2148001': 1, u'O-LMDGC': 1, u'365882': 1, u'365576': 1, u'ilito': 1, u'microserver': 1, u'+342080 +LP +TYPage': 1, u'convergedsystem': 1, u'365976': 1, u'366607': 1, u'1040': 1, u'+352887 +LP +RegPage': 1, u'1142001': 1, u'HP OneView': 1, u'+342080 +LP +RegPage': 1, u'x476': 1, u'Autobahn': 1, u'344581': 1, u'storevirtual': 1, u'MSA 1040': 1, u'351708': 1, u'2645': 1, u'41134001': 1, u'+352887 +eDM': 1, u'368530': 1, u'+342080 +352887 +Customer +Presentation': 1, u'+352887': 1, u'M476': 1, u'365791': 1, u'StoreEasy': 1, u'REVOLVE': 1, u'368043': 1, u'+344581': 1, u'+344373': 1, u'Moonshot': 1, u'366102': 1, u'acf': 1, u'360623': 1, u'342080': 1, u'344373': 1, u'265893': 1, u'+365882': 1, u'+352887 +OnlineBanners': 1, u'+342080 +OnlineBanners': 1, u'352887': 1, u'+365791': 1} |
| MULTIMEDIA | {u'training': 1, u'las vegas': 1, u'Slate21': 1, u'storeserv': 1, u'future': 1, u'1102': 1, u'innovation': 1} |
| OTHERS | {u'dreamcolor': 1, u'Voice Tab': 1, u'icons': 1, u'Revolve 810': 1, u'M401': 1, u't2500': 1, u'music': 1, u'rove': 1, u'x585': 1, u'M830': 1, u'icon': 1} |

FIG. 7

SEARCH SYSTEMS AND METHODS UTILIZING SEARCH BASED USER CLUSTERING

CROSS-REFERENCE TO RELATED APPLICATION(S)

This application is a continuation of, and claims a benefit of priority under 35 U.S.C. 120 of the filing date of U.S. patent application Ser. No. 16/891,837, filed Jun. 3, 2020, entitled, "SEARCH SYSTEMS AND METHODS UTILIZING SEARCH BASED USER CLUSTERING," now U.S. Pat. No. 11,556,590, which is a continuation of, and claims a benefit of priority under 35 U.S.C. 120 of the filing date of U.S. patent application Ser. No. 15/991,521, filed May 29, 2018 entitled, "SEARCH SYSTEM UTILIZING SEARCH BASED USER CLUSTERING," now U.S. Pat. No. 10,706,107, which claims a benefit of priority under 35 U.S.C. § 119 to U.S. Provisional Application No. 62/512,207, filed May 30, 2017, entitled "SEARCH SYSTEM UTILIZING SEARCH BASED USER CLUSTERING," by inventors Ardite and Poston all of which are hereby incorporated herein for all purposes.

COPYRIGHT NOTICE

A portion of the disclosure of this patent document contains material to which a claim for copyright is made. The copyright owner has no objection to the facsimile reproduction by anyone of the patent document or the patent disclosure as it appears in the Patent and Trademark Office patent file or records, but reserves all other copyright rights whatsoever.

TECHNICAL FIELD

This disclosure relates generally to searching of digital assets. More particularly, embodiments disclosed herein relate to systems, methods, and computer program products useful for improving the performance or other aspects of the search functionality of computer systems. Even more specifically, embodiments as disclosed herein relate to improving the search functionality of content management systems, including digital asset management and multimedia management systems, utilizing user driven searching.

BACKGROUND

Digital asset management (DAM) generally refers to the organization, creation, management, distribution and archiving of digital assets (interchangeably referred to herein as content or documents). Specifically, DAM may involve the creation of an archive, the development of an infrastructure to preserve and manage digital assets and a search functionality that allows end users to identify, locate and retrieve digital assets. In many DAM systems, such search functionality may be provided by receiving, parsing and processing the terms (e.g., keywords) of search requests.

While DAM technologies were once used almost exclusively by publishing and media companies, they are increasingly being incorporated into content management systems to manage other digital assets such as photos, music, videos, animations, podcasts and other multimedia content. Further, DAM technologies are being employed on enterprise-level scales, with concomitant increases in the volume and computational overhead associated with searching for managed assets.

Due to unfamiliarity with the content contained in these DAM systems, or the breadth of content types and volume in such systems, users may submit a greater number, or more complicated, search queries to the DAM system to find managed content of interest. The greater the volume and complexity of these search queries, the greater the degradation in the search performance and access times of these systems. Moreover, and importantly for the users of such systems, many of these searches may return less content for such searches, or content that is less relevant or precise than is desired.

Accordingly, what is desired are systems and methods for improving the functionality of searching in DAM or other types of systems to, for example, improve computing performance of such systems, reduce the burden of implementing such searches and improve the results of such searches.

SUMMARY

To provide a bit more context, the increased scale of digital asset management (DAM) systems and expanded range of digital assets under management may introduce a stratification of the universe of users of DAM systems. In some cases, this stratification may take the form of a subset of core users making extensive use of the DAM system by frequently submitting search queries for, and downloading, managed content. The usage patterns of such core users may be indicative of content of especial interest to particular sets of shareholders in the enterprise. In addition to this core of heavy DAM system users, there may also be one or more further strata of more casual DAM system users who may be unregistered, or who do not search for, or download, managed content from the DAM as frequently. Due to unfamiliarity with the DAM system or other reasons, it may be that these casual users may submit comparatively more (or more complicated) search queries to the DAM system to find managed content of interest. Depending on the scale of an enterprise, the usage patterns of non-core users may present avoidable computational burdens on the resources of the DAM system.

Accordingly, embodiments of methods and systems for modeling the search or download activities of a core group of system users (e.g., users who have over a threshold number of searches or interactions with the system) and utilizing such models to improve the performance of search systems are disclosed. Such modeling may entail labeling the keyword search terms received at the system and clustering core users. Each cluster of users may be defined, for example, according to one or more concepts or conceptual vectors including labeled search terms. For example, an enterprise scale DAM system of a computer company may receive a high volume of searches for managed content containing alphanumeric strings or invented words (e.g., "ZX1000" or "PowerMax") followed by downloads of particular assets. In some cases, these search terms may, for example, map meaningfully to a conceptual search vector, such as the name of a product line or advertising campaign. Further, there may be an association between the conceptual search vector and the managed content ultimately downloaded. For example, a particular group of users who submit search queries (also referred to just as queries) using the keyword "ZX1000" may, ultimately download managed assets relating to the "ZX900," a predecessor product to the "ZX1000." Embodiments of improved systems and methods as disclosed herein may account for such a nexus between groups of users, search query inputs and downloaded managed assets.

In particular, embodiments of the systems and methods leverage the determined clusters of users, search query inputs and information about managed assets actually downloaded to improve the performance of the search functionality of the system. According to certain embodiments, this improvement may be attained by using such user clusters to present searching users (e.g., including both core users and casual, non-core system users) with suggestions that allow them to easily locate managed content for access or download. These suggestions may include, for example, presenting search users with suggested keywords for use as search terms or frequently accessed managed assets based on a determination that the searching user belongs to a particular cluster or can be associated with such a cluster. Alternatively, users may simply be presented with suggested search terms or suggested managed assets based on clustered search data. In other embodiments, users within a cluster may receive a targeted message regarding managed assets for download based on a cluster or search vector with which they are associated. In this manner, in an enterprise environment for example, users may be presented with targeted messages regarding content associated with a new product, a marketing campaign, or other entities which may be associated with irregular or conceptual terms or labels (e.g., the "ZX1100" product).

Embodiments disclosed herein can thus address at least the aforementioned drawbacks and provide particular and additional technical advantages, solutions and benefits. Specifically, embodiments that utilize such clustering and leveraging of user search query data may improve the overall performance of a system by reducing the volume of search queries to be processed by connecting search users with managed assets of actual interest with fewer searches, allowing the system to provide manage assets for access without performing the search and by providing data which can be used to optimize and improve existing search indices of the search functionality to better align keywords with managed assets of interest. In some cases, by presenting the user with desired assets, embodiments may obviate the need to actually execute the search itself, reducing the use of computational resources (including processing time, memory usage, etc.) and greatly reducing the amount of time required to access desired resources. Another benefit of certain embodiments may be that, by providing suggestions based on core users (who may have more knowledge regarding the availability of content in the system or how keywords are being utilized), the search experience is improved as the data for core users may be leveraged to provide suggestions to searching users. Moreover, as the usage of the search system grows, the relevancy and precision of the search system may grow commensurately, as users may be clustered more accurately and the search terms and assets suggested to searching users likewise refined. It should be noted here, that while certain embodiments have been described herein in conjunction with a DAM system and associated searches, embodiments may be equally usefully applied in almost any context where searches of digital asset by users are accomplished or utilized.

One embodiment comprises a search system embodied on a server computer, the search system comprising a search module, a clustering module and a repository that may include managed assets, wherein the search module receives user query event data comprising user identifier (ID) data, keyword data, or query result data. The clustering module may store the user query event data and output collected user query event data to a clustering module, wherein the clustering module is configured to generate one or more user clusters, each cluster comprising a plurality of user IDs associated with a search vector or a set of critical labels or principle dimensions for the cluster.

Embodiments may be implemented in a search system that may be utilized with a content management system such as a DAM system or the like. The search system comprising a search module, a clustering module, a suggestion module and at least one repository. The search system can be accessed over a computer network by users to search managed digital assets using the search module. In this embodiment, the search module is configured to receive search query events and store the search query events as user query event data, the user query event data comprising user ID data, keyword data, and query result data. Further, the search module may collect or aggregate the user query event data and provides the user query data to the clustering module.

In one embodiment, the clustering module generates query structures (also referred to just as a struct or structs) for each user query event, wherein each query struct associates, for a particular user query event, a user ID, at least one keyword and at least one critical label with the user query event. A query structure may be for a user, where that query structure includes a user ID for a user, a set of critical labels associated with user queries submitted by the user, and a count associated with each of the critical labels used by the user in that user's searches.

To determine any critical labels associated with a user query, the clustering module may utilize one or more dictionaries. Each dictionary may include a mapping between keywords and critical labels. The cluster module can evaluate each keyword of a user's search against each dictionary to determine if the keyword can be associated with a critical label. If so, the critical label may be added to a query structure for a user or a count associated with the critical label in the query structure for the user incremented. In one embodiment, the one or more dictionaries may include a set of hierarchically ordered dictionaries where each keyword of the user's query may be evaluated against the set of dictionaries according to the order of priority, such that if a match is found between a keyword and a critical label in a particular dictionary this critical label may be added (or a count incremented) in the query structure and the evaluation of that keyword against the set of dictionaries stopped at the point a match is found. By utilizing a priority of the dictionaries, more specific dictionaries may be ordered as higher priority dictionaries than less specific dictionaries. More specific dictionaries may, for example, be dictionaries associated with specifics of an enterprise, such campaigns, divisions, products or marketing terms of the enterprise. Accordingly, dictionaries and their associated critical labels and associated keywords may be tailored specifically to the environment (e.g., the enterprise) in which the search system is employed, further increasing the efficacy of the search system, as users may be clustered using terms specific to, or utilized within, such an environment.

In one embodiment, only query structures corresponding to users that have more than a number of user query events meeting or exceeding a hit threshold may be saved for processing by the clustering module. For example, the number of user query event hits may be user submitted query events (e.g., user submitted searched), such that if the number of search queries submitted by a user exceeds a hit threshold (e.g., eight searches), a query structure for that user may be saved in a query structure file for providing to the clustering module. In another embodiment, a user query event hit may be when a keyword of a user submitted search matches a critical label in a dictionary, such that if the query structure for the user indicated a combined count for all critical labels greater than a hit threshold (e.g., 8 hits) the query structure for that user may be saved in a query structure file for providing to the clustering module. By ensuring that only query structures for users who meet or exceed some threshold relating to the number of searches of utilization of certain keywords or critical labels, it can be ensured that only expert or core users will be clustered, and thus it is the search activity of these core users that may be subsequently used to provide suggestions to searching users.

The clustering module evaluates a saved set of query structures for the users to determine a set of user clusters and save these user clusters in a search clustering file. The search clustering file comprises a set of clusters. Each cluster may include one or more user IDs associated with a search vector including critical labels associated with the search vector. The search clustering file is stored by the clustering module such that it can be accessed by a suggestion module or another type of module. It will be noted that the generation of the search clustering file for use in determining suggestions by a search module or the like may be determined asynchronously to the operation of the search module at almost any time interval desired.

When a new search query is received from a user (e.g., through an interface associated with a search module) a suggestion module can determine whether a user ID associated with the new user query event is associated with a cluster as stored in the search clustering file. Based at least in part on the determination of whether the user ID associated with the new user query event belongs to a cluster, the suggestion module can provide suggested search terms a suggestions of managed assets to download to the searching user through the interface; or interface with a messaging module to send a message to one or more users of a cluster. This message may indicate a user associated with the cluster has accessed an asset or submitted a particular type of search. Moreover, user queries (e.g., user query events) that are received or responded to may be stored by the search module to generate the user query data that may be utilized by the clustering or other modules of the search system. Again, the user query data for user query events may include, for each received user query event, a user ID, at least one keyword and query result data associated with the user query event.

In one embodiment, a search system may store user query event data and a search clustering file in a data store. The user query event data includes a plurality of user query events, where each user query event includes a user ID associated with the user query event and one or more keywords associated with the user query event. The search clustering file defines a plurality of user clusters, each user cluster comprising a set of user IDs associated with a search vector defined by one or more critical labels. The search system may also include a clustering module and a suggestion module. The clustering module accesses the user query event data and generates the search clustering file.

In particular, in one embodiment, the clustering module may generate the search clustering file by generating a plurality of query structures for a set of users of the search system. To generate the query structures the clustering file may, for each of the user query events in the user query event data, evaluate each of the one or more keywords of the user query event to determine if a label is associated with the keyword and assign the label to the user query event when the label is associated with the keyword. A query structure can then be created for each user query event for which at least one keyword of the user query event is associated with the label and the plurality of query structures for the set of users saved based on a number of user query event hits for each user and a hit threshold. A clustering rule can then be applied to the plurality of query structures to generate the plurality of user clusters, the set of user IDs associated with each cluster, and the search vector for each of the plurality of user clusters.

The suggestion module can provide suggestions to searching users by receiving a user query event from a user and in response to receiving the user query event, determining a user identifier of the user and accessing the search clustering file based on the user identifier of the user to determine if the user can be associated with a cluster of the plurality of user clusters of the search clustering file. Based on the cluster with which the user is associated the suggestion module can provide to the user a suggested search query term wherein the search query term is associated with the cluster or provide to the user a suggestion of a managed asset available for access, wherein the managed asset is determined based on the cluster.

In a specific embodiment, the data store may comprise a plurality of dictionaries, each dictionary associating keywords with corresponding labels, and evaluating each of the one or more keywords of the user query event to determine if a label is associated with the keyword comprises evaluating the keyword against the plurality of dictionaries to determine if the keyword is associated with the label in plurality of dictionaries. These dictionaries may, for example, be ordered by priority where a keyword is evaluated against each of the plurality of dictionaries in the order of priority.

In certain embodiments, the user query event data further comprises, for at least one of the plurality of user query events, an identifier of one or more managed assets downloaded in association with the user query event. The managed asset of the suggestion could be, for example, a managed asset accessed by another user of the cluster.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 5 depicts the contents in an example search clustering file.

FIG. 6 depicts contents of one example of a suggestion dictionary file.

FIG. 7 depicts contents of another suggestion dictionary file according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions or rearrangements within the spirit or scope of the underlying inventive concept will become apparent to those skilled in the art from this disclosure.

Figure 1:
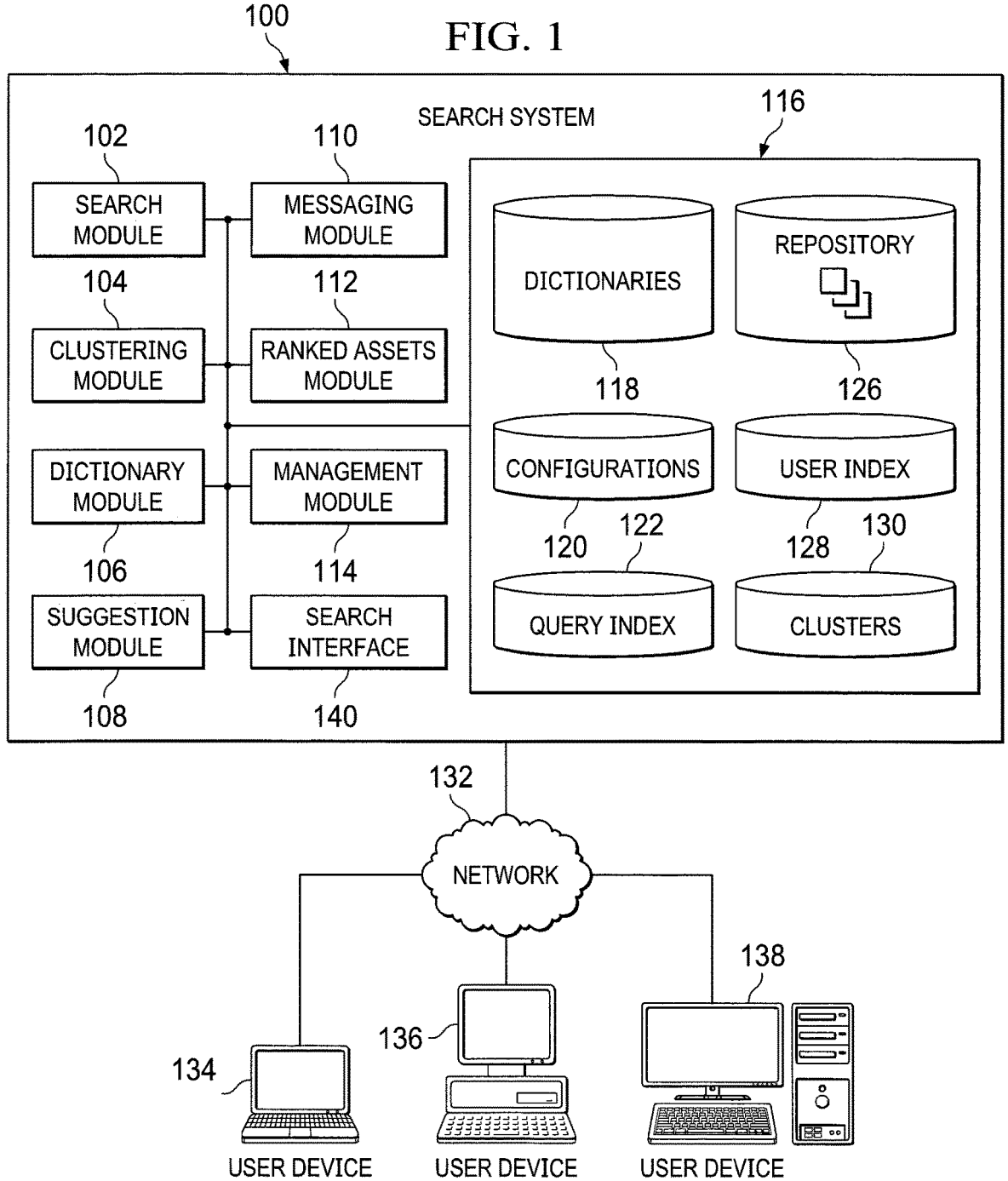
FIG. 1 depicts a diagrammatic representation of an embodiment of a computing environment and search system.

FIG. 1 provides a diagrammatic representation of one embodiment of a computing environment including a search system implemented. In FIG. 1, a search system 100 is communicatively connected via a network 132 to one or more user computing devices 134, 136 and 138 such as desktop computers, laptops, tablets, smartphones or other computing devices. Network 132 can be a global computer network such as the Internet, a local area network (LAN), a wide area network (WAN), a wireless network or any computer network known in the art. Users at the user computing devices 134, 136, 138 can thus access the search system 100 using an interface that may be presented by search system over network 132 such as a web based interface (e.g., a web page accessible by the user through a browser on the device 134, 136, 138, a web service, an application programming interface (API) or the like) or a proprietary application. The search system 100 may be utilized to search a set of digital assets in repository 126. These digital assets may be, for example, managed by a content management system such as a digital asset management (DAM) or the like.

The interfaces presented by the search system 100 may thus be suitable for receiving search queries for searching content in repository 126 by search system 100, presenting the results of search queries for this content or suggestions related to search queries or managed assets to users, registering a user with search system 100 as a registered user of search system 100 or DAM with which the search system 100 is associated or other functionality. According to some embodiments, the interface may be graphical user interfaces (GUIs) or browser based interfaces (e.g., web pages, web services or the like) provided from search system 100 (e.g., from search module 102).

According to certain embodiments, search system 100 may be embodied on one or more server computers having one or more processors, connectivity to network 132 and non-transitory storage repository 116 for storing dictionaries 118, configuration files 120, query index 122, managed content repository 126, assets 126, user index 128 and clusters 130. The search system 100 may also include a search module 102, a clustering module 104, a dictionary module 106, a suggestion module 108, a messaging module 110, a ranked assets module 112 and management module 114. Each of these modules will be described in greater detail herein. Note that the architecture described is one example of an implementation of an embodiment of a search system and numerous other architectures, including distributed, multi-server and cloud-based architectures are possible for search system 100, depending on the scale and geographic scope of the enterprise using search system 100 without loss of generality. Further, as noted above, according to embodiments, search system 100 may be part of a DAM system or utilized with such a system, such as the DAM systems provided by OpenText Corporation, or it may be separate from such a DAM system. Skilled artisans will appreciate that numerous configurations may be possible and embodiments of such search systems may be utilized in other contexts.

In the embodiment shown in FIG. 1, a search module 102 receives user query events submitted by a user at a user device 134, 136, 138 over the network 132. The user query events may be keyword or form-based searches for one or more relevant assets in managed content repository 126. A user query event may be submitted as a fully entered keyword search (for example, a user entered all of the intended keywords and clicked a "search" button on a search interface 140), or from data indicating search related input at a user interface. For example, entering "Barcelona Hotels" at a user interface, and hitting a "search" button may comprise a submission of a user query event. Likewise, entry of a syntactically meaningful string at a user interface (e.g., typing "Barcelon") may also suffice to submit a user query event to search module 102. It will be noted that multiple search events may be submitted to the search system 100 in association with a single search.

Upon receipt of a user query event, search module 102 interfaces with managed content repository 126, which contains a plurality of managed assets to identify managed assets relevant to the submitted user query event. Managed assets may be documents, media files, web pages or other items of digital content capable of being managed. By way of illustrative example, if a user submits the keywords "Barcelona Hotels" as part of a user query event, the search system will search the asset of content repository 126 for managed assets, such as web pages and documents relating to Barcelona or hotels in Barcelona that are indexed or having metadata indicating their relevance to the keywords "Barcelona Hotels." The indexing and generation of metadata relating to assets in managed content repository 126 may be performed by management module 114. Management module 114 may, according to some embodiments, be a DAM system or a component of a DAM system with which the search system 100 is included. Search module 102 may return search results via network 132 through a user Interface presented on a user device 134, 136, 138. Subsequent to receiving search results, a user may download or otherwise accessed (e.g., open, review metadata of, or take other actions specific to an asset) one or more of the managed assets contained, linked or otherwise referenced in the search response using user interface. In such cases, the user interface provided by search system 100 (e.g., at user device 134, 136, 138) may notify search module 102 as to which managed assets were accessed by user 134.

In the embodiment of FIG. 1, user index 128 contains an index of registered users of search system 100 (e.g., users who have been assigned a unique identifier (ID)), and user IDs associated with the registered users of search system 100. Search module 102 may, in addition to returning search results in response to a submitted user query event, also perform a lookup operation in user index 128 to determine whether the user query event is associated with a registered user of search system 100 and, if so, to look up the user ID associated with a received search query event.

Further, search module 102 creates and stores user query events in query index 122, or data associated therewith, including for example, the query terms including the keywords or strings associated with the user query event (e.g., "Barcelona Hotels" or "Barcelon"), a user ID associated with the user query event, any results returned by search module 102 in response to the user query event, and any assets accessed by user 134 in association with the user query event as user query event data. Thus, the query index may maintain a history of each query event received by the search system 100 and data associated with these query events. The query index 122 may be stored in a highly reliable indexing system or repository such as Apache Solr.

Search module 102 may, either periodically, or on a rolling basis, normalize the stored user query event data (e.g., in the query index 122). Such normalization by search module 102 may comprise, for example, converting the user query event data to a tractable file format, such as comma-separated value format (e.g., .csv) or eXtensible Markup Language (XML) file. Normalization may also comprise standardizing instances of the keywords corresponding to the same keyword, such as by eliminating capitalization and plurals or by correcting minor misspellings. Returning to the "Barcelona Hotels" example, user query event data for different queries corresponding to instances of "Barcelona," "barceloana" and "Barcelon" received at search module 102 may, after being normalized, all be stored as "barcelona" in query index 122. Thus, each query event may include a normalized set of keywords, a user ID, any results returned by search module 102 in response to the user query event and any assets accessed by user 134 in association with the user query event as user query event data.

Where, in association with a user query event, a user (e.g., at user device 134, 136, 138) has actually accessed (e.g., downloaded, opened, reviewed, or the like) a managed asset from managed content repository 126, search module 102 may notify ranked assets module 112 of the access. In the embodiment of FIG. 1, ranked assets module 112 maintains data on accesses of managed assets sufficient to create one or more ranked indices of the managed assets in repository 126 most frequently downloaded from managed content repository 126. This ranking of assets may be determined, for example, from the data included in the query index 122.

In the embodiment shown in FIG. 1, clustering module 104 implements one or more rule sets to generate clusters 130 of users from user query event data stored in query index 122. According to certain embodiments, a cluster defines a set of user IDs for the cluster of users associated with a search vector defined by one or more labels (e.g., critical labels or primary dimensions). Thus, a search clustering file may be stored that defines the clusters 130 by associating a plurality of user IDs to a critical label or search vector associated with keywords used to search for certain managed assets 126 in managed content repository 126. This association may also include a measure of association or correspondence between the labels and the cluster. Each cluster may also be assigned a name. Such a name may be a human readable name assigned by an administrator or operator of a search system (e.g., based on the critical labels associated with the cluster) or a machine assigned name (e.g., the critical label for the cluster with the highest correspondence).

By way of clarifying example, the managed content repository 126 of a search system 100, may contain millions of assets pertaining to a host of topics. A global technology company may have, for example, managed content pertaining to its product lines, advertising campaigns, employee lifestyle and wellness information, as well as managed content from its users and affiliates. Accordingly, search vectors may be created to define a coordinate space for nuanced categorization of, for example, assets within the content repository 126, keywords used to search for managed assets 126, or other data elements used in the search, categorization and management of managed assets 126.

Table 1 below provides an example of assigning coordinates to query keywords along two search vectors, U1 and U2.

TABLE 1

| Mapping Query Keywords to Search Vectors | | | | |
|---|---|---|---|---|
| | Phelps | Latex | . . . | talking |
| U1 | 0 | 5 | | 0 |
| U2 | 10 | | | 8 |

In the example above, three labels are shown as the column headers "Phelps," "Latex" and "talking." Similarly, the two search vectors, U1 and U2 are shown as row headers. Each of search vectors U1 and U2, correspond to concepts of interest or categories associated with managed assets (e.g., assets managed by a DAM system associated with management module 114). In this example, suppose U1 is a first search vector corresponding to "physical substances" and U2 is a search vector corresponding to "athletes in the news." In this example, the label "latex" has a coordinate value of "5" along search vector U1 and a coordinate value of zero along search vector U2, perhaps reflecting the fact that the label "latex" may alternately refer to a type of rubber or typesetting software, but almost never refers to athletes. Similarly, "Phelps" has a coordinate value of "0" along search vector U1 and a coordinate value of "10" along search vector U2, perhaps reflecting the fact that the label "phelps" typically arises in reference to the Olympic swimmer Michael Phelps, and almost never in the context of materials science.

Note that, according to embodiments, search vectors may not be orthogonal to one another, thereby reflecting the overlap between real-world semantic concepts. For example, in addition to the "athletes in the news" search vector described above, there may also be "women in sports," or "Premier League football" search vectors. Certain label strings, such as, for example, "Arsenal F.C. Youth Teams" may register coordinate values along all three search vectors. Assignment of coordinate values to labels may be performed by dictionary module 106, which may perform a semantic analysis of keywords or comparison with values in one or more existing dictionary of dictionaries 118. Skilled artisans appreciate that numerous embodiments for defining labels within the search vectors' coordinate space may be possible. In some cases, such as in enterprise scale DAM systems, there may be as many as 80 or more search vectors describing a coordinate space for critical labels or keywords.

Table 2 below provides a further example of mapping to a search vector defined coordinate space.

TABLE 2

Mapping Critical Labels to Search Vectors

| | Physical entity | Abstraction | OT Servers | ... |
|---|---|---|---|---|
| U1 | 0 | 5 | | |
| U2 | 10 | | | |

Note that, according to some embodiments, intermediate data structures such as critical labels categorizing query keywords, may also map to search vectors. In the example of Table 2, three such critical labels "Physical entity," "Abstraction" and "OT Servers" are shown as column headers. Again, two search vectors "U1" and "U2" are shown as row headers. In this example, U1 may be a search vector associated with "customer satisfaction" and U2 may be a search vector associated with "tangible things." Thus, in this example, the critical label "abstraction" may map relatively well to the vector "customer satisfaction," as reflected by the coordinate value of "5." At the same time, the critical label "physical entity" may not map particularly closely to the "customer satisfaction" search vector, hence the coordinate value of "0." Note also that, according to some embodiments, a search vector may be defined as the critical label which maps best to a set of keywords. In such cases, search vectors and critical labels may be co-extensive and a critical label such as "lifestyle" or "OT servers" may also be a search vector.

In some cases, the clusters 130 in the search clustering file generated by clustering module 104 may, in addition to associating a plurality of user IDs with a search vector, also associate critical labels with a cluster. In the example of FIG. 1, the query keywords contained in the user query event data may be assigned critical labels by clustering module 104. Instances of a search clustering file may be stored in search system 100 to define clusters 130. Critical labels can provide an additional layer of semantic abstraction or aggregation that facilitates the generation of clusters in a more computationally efficient manner. Returning to the example of a search in which a user enters the query keywords "Barcelona Hotels," the keywords "Barcelona Hotels" may have non-zero coordinate values for numerous search vectors. Of course, the coordinate values for "Barcelona Hotels" along many search vectors may be negligible.

As clustering module 104 not only assigns user IDs to clusters but also selects the search vectors to build clusters around, it may be computationally desirable to simplify these calculations and eliminate search vectors having negligible coordinate values. Critical labels can serve to map query keywords to broader, more discriminant categories so that the determination of clusters using certain clustering rules (e.g., algorithms) may be performed on a less granular data set, the processing of which requires fewer system resources.

In the example of FIG. 1, clustering module 104 may apply one or more rules utilizing one or more dictionaries 118 stored in repository 116 to assign critical labels to user query event data (e.g., to be stored in query index 122 or with clusters 130). Dictionaries 118 may be loaded or generated by dictionary module 106. A dictionary may define mappings between keywords and critical labels. In this manner, a keyword of a query event may be used to access the dictionary and determine any associated critical labels. Specifically, each dictionary may include a mapping between keywords and critical labels. Cluster module 104 can evaluate each keyword of a user's search (e.g., as included in query event data) against each dictionary to determine if the keyword can be associated with a critical label. In one embodiment, the one or more dictionaries may include a set of hierarchically ordered dictionaries where each keyword of the user's query may be evaluated against the set of dictionaries according to the order of priority, such that if a match is found between a keyword and a critical label in a particular dictionary, this critical label may be utilized and the evaluation of that keyword against the set of dictionaries stopped at the point a match is found. By utilizing a priority of the dictionaries, more specific dictionaries may be ordered as higher priority dictionaries than less specific dictionaries. More specific dictionaries may, for example, be dictionaries associated with specifics of an enterprise, such as campaigns, divisions, products or marketing terms of the enterprise. Accordingly, dictionaries and their associated critical labels and keywords may be tailored specifically to the environment (e.g., the enterprise) in which the search system is employed, further increasing the efficacy of the search system, as users may be clustered using terms specific to, or utilized within, such an environment.

Thus, in one embodiment, the clustering module 104 may look up keywords contained in user query event data in one or more of a plurality of dictionaries in a predetermined sequence, until a "hit" associating a keyword with a critical label is found. For example, according to one set of rules, clustering module 104 may initially consult a dictionary of product names, followed by a dictionary of proper place names, followed by a dictionary of advertising campaigns. Thus, in the example of "Barcelona Hotels," as a query keyword, it is likely that these keywords would not appear in the first dictionary of product names, but a hit for the second dictionary of proper places names would occur. The second dictionary of proper place names may contain an entry linking one or more critical labels, such as "Europe" and "Lifestyle" to the keyword "Barcelona Hotels." In this example, the algorithm would stop before reaching the third step of consulting a dictionary of advertising campaigns. According to another set of rules, clustering module 104 may initially consult a dictionary of product names, followed by an English dictionary mapping terms to classifications (e.g., 'abstraction', 'physical entity' 'person', etc.) such as the nltk dictionary of Python), followed by a dictionary of advertising campaigns.

Cluster module 104 may also perform a self-optimization of the clustering rules (e.g., algorithm) or dictionaries 118 applied. For example, if the clustering module 104 finds that the majority of "hits" occur with the second dictionary of proper place names, it can adjust the algorithm to initially consult the placename dictionary rather than the dictionary of product names. Code and settings for performing such adjustments may be maintained within configuration repository 120.

In the embodiment of FIG. 1, clustering module 104 may output or store the search clustering file (e.g., in repository 116) so that it may utilized by suggestion module 108 and dictionary module 106. Dictionary module 106 may construct, from the search clustering file and user query event data in query index 122, a dictionary of suggested query keywords associated with each cluster 130 of the search cluster file. This suggestion dictionary may include a mapping between identifiers for each of the clusters of the search clustering file and an ordered list of keywords or critical labels that may be suggested to users identified with that cluster. Moreover, suggestions dictionary may include identifiers for a set of ordered managed assets contained in repository 126 that are most frequently accessed by users of that cluster. These identifiers may be determined, for example, using data on accesses of managed assets maintained by ranked assets module 112 and determined from the access data included in the query index 122.

In this example, suggestion module 108 may also interface with search module 102 and dictionary module 106 such that, when a new user query event from user 134 is received at search module 102, suggestion module 108 may provide the search module 102 with suggested query keywords from the dictionary of suggested query keywords generated by dictionary module 106. Alternatively, suggestion module 108 may interface with ranked assets module 112 to provide search module 102 with a list of managed assets in content repository 126 to present through the user interface for potential access by a user. Similarly, suggestion module 108 may interface with management module 114 to generate a message to user 134, based at least in part on a determination that user 134 is associated with a user ID belonging to a cluster in the search clustering file. Rules for outputting keyword suggestions, recommended assets and messaging users associated with clusters may be maintained in configuration repository 120.

Figure 2:
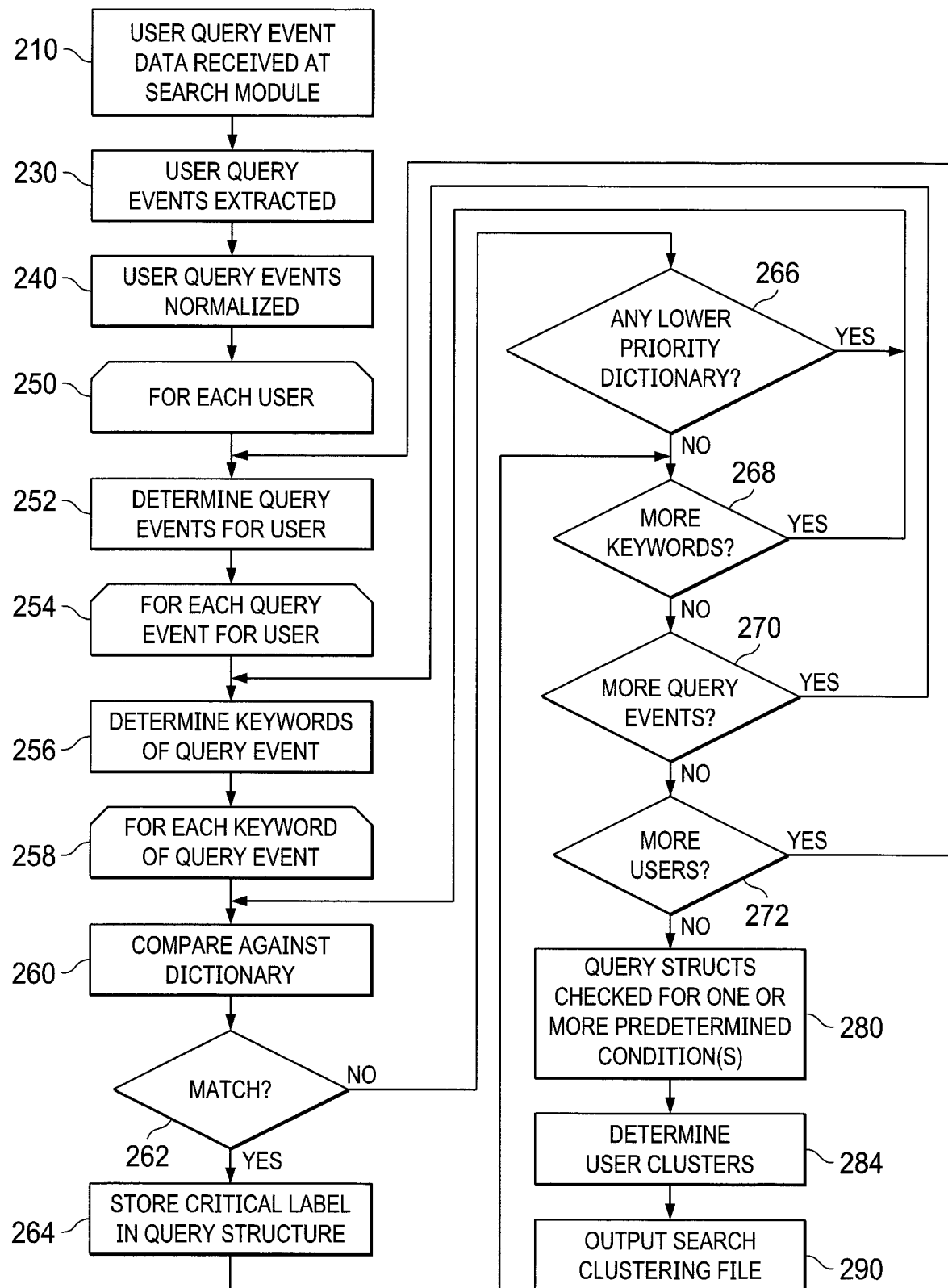
FIG. 2 provides a flow diagram of an embodiment of a method for generating search clustering files according to some embodiments.

Turning now to FIG. 2, a flow chart illustrating one embodiment of a method for generating a search clustering file is depicted. In this embodiment, the method begins at step 210, when user query event data including user query events is received at a search system. The received user query events may be stored according to any number of file formats known in the art, including without limitation, Apache Lucene or Xapian.

At step 230, the user query event data are converted into user query events. This conversion may, in cases in which the generation of a search clustering file is performed in real time, be performed as an ongoing process. Alternatively, in cases where the search clustering file is not continuously updated, it may be performed during off peak times for the search system, such as part of a regularly scheduled cron job.

The conversion of the user query data to user query events may include extracting user query events from the user query event data into a tabulated format, such as .csv or XML. Further, at step 240, the data may be normalized or scrubbed to eliminate instances of irrelevant or prohibited keyword searches (e.g., keywords containing expletives or other content to be excluded). At this point then, the user query event data may include a set of user query events, where each user query event is associated with a user search and may include the query terms including the keywords or strings associated with the user query event, a user ID associated with the user query event, and results returned in response to the user query event.

Critical labels may then be assigned to the query events and query structures generated for users or a user's query events. As discussed elsewhere in this specification, critical labels can be terms which, at a higher level of abstraction than the query keywords themselves, usefully capture one or more common conceptual threads amongst the managed assets which users submitting user query events are searching for. Thus, for example, the keywords "summer," "bicycle" and "soccer" may be usefully assigned the critical label "lifestyle." Assignment of critical labels may be performed using a number of rules based approaches known in the art, including, without limitation, natural language processing, named entity recognition or reference to multiple user or system-generated dictionaries of query keywords and critical labels.

Here, every user identified in the user query events may be determined and at step 250, for each user identified in the user query event data, each of the query events associated with that user may be determined at step 252. These determinations may be made by evaluating the user IDs for each user query event in the user query event data. Specifically, to determine the users for the user query event data, the user query events may be grouped by associated user ID, where each user ID represents a single user. In one embodiment, if the user does not have a threshold number of user query event hits (e.g., the user has not made a threshold number (for example, eight) searches using the search system), no further processing may be done on that user's user query events and those user query events may be disregarded in subsequent processing and the next user evaluated. This determination may be made, for example, by determining the number of user query events associated with a user ID and determining if that number is equal to, or exceeds the threshold.

Once the user query events for a user are determined, each user query event for the user may be evaluated against the dictionaries of the search system at step 254. As discussed, these dictionaries may include a hierarchy of dictionaries, where if a hit for a keyword is found in a particular dictionary, there may be no need to evaluate that keyword against any other lower priority dictionaries in the hierarchy. Thus, each keyword of the query event may be determined at step 256.

Then, at step 258, for each of the keywords in the user query event for the user, the dictionaries being utilized by the search system may be accessed and the keyword compared against one or more of the dictionaries at step 260 in the order of priority of the dictionaries to determine if the keyword is associated with any critical label in the dictionary. If a match between that keyword and a critical label can be determined from that dictionary at step 262, the critical label may be stored in a query structure corresponding to the user query event or user at step 264. If a query structure for the user query event or user does not exist at this point, a query structure may be created for the user query event or user and stored. Such a query structure may include a user ID and one or more critical labels determined for keywords of user query events associated with that user. The critical label may be associated with a count indicating the number of times a user utilized keywords associated with the critical label in the user's query events. Thus, if a determined critical label already exists in a query structure, a count associated with that critical label may be incremented. At this point, the evaluation of the keyword against the set of dictionaries may stop and it can be determined if any more keywords of the user query event need to be evaluated against the set of dictionaries at step 268. If there are more keywords of the user query event to evaluate (Y branch of step 268), the next keyword of the user query event may be obtained and evaluated against the dictionaries at step 260 starting with the highest priority dictionary.

If, however, there is no match between that keyword and a critical label according to that dictionary (N branch of step 262), it can be determined at step 266 if there are any remaining lower priority dictionaries which the keyword has not been evaluated against. If there are lower priority dictionaries which the keyword has not been evaluated against (Y branch of step 266), the next dictionary according to the hierarchy of the dictionaries may be obtained and the keyword compared against this dictionary at step 260. If the keyword has been evaluated against the lowest priority dictionary of the hierarchy of dictionaries (N branch of step 266), it can be determined if any more keywords of the user query event need to be evaluated against the set of dictionaries at step 268. If there are more keywords of the user query event to evaluate (Y branch of step 268), the next keyword of the user query event may be obtained and evaluated against the dictionaries at step 260 starting with the highest priority dictionary.

If, however, there are no more keywords of that query event (N branch of step 268), it can be determined at step 270 if there are any additional user query events in the query events for that user. If there are more user query events of the user to evaluate, the next user query event may be obtained the keywords of that user query event evaluated against the dictionaries beginning at step 266. If, however, there are no more user query events associated with the user (N branch of step 270), then at step 272, it can be determined if there are any more users whose user query events have not been evaluated. If there are more users, the query events for that user may be determined and evaluated beginning at step 252.

Having processed all of the user query event data which generated hits for keywords in a dictionary (referring to instances where a user one or more critical labels can be assigned to keywords in the user query event data), a query frequency dictionary, associating user IDs with the number of user query event hits for the user may be determined and stored. These user query event hits may be the number of queries or user query events associated with the user or hits of those keywords contained in the user's query events. In this way, core users whose search and query activity may be leveraged by search system to provide suggestions, recommended assets and messages to reduce the number of searches processed by the search system may be identified. The query frequency dictionary may, for example, be generated using the "defaultdict" function from the Python standard library.

In one embodiment, only query structures corresponding to users that have more than a number of user query event hits meeting or exceeding a hit threshold may be saved for processing by the clustering module. For example, the number of user query event hits may be user submitted query events (e.g., user submitted searched), such that if the number of search queries submitted by a user exceeds a hit threshold (e.g., eight searches), a query structure for that user may be saved in a query structure file for use in clustering. In another embodiment, a user query event hit may be when a keyword of a user submitted search matches a critical label in a dictionary, such that if the query structure for the user indicated a combined count for all critical labels greater than a hit threshold (e.g., eight hits) the query structure for that user may be saved in a query structure file for providing to the clustering module. Again, by ensuring that only query structures for users who meet or exceed some threshold relating to the number of searches of utilization of certain keywords or critical labels, it can be ensured that only expert or core users will be clustered, and thus it is the search activity of these core users that may be subsequently used to provide suggestions to searching users.

Accordingly, at step 280, a filtering function may be performed, wherein query structs satisfying one or more predetermined conditions are identified. In some cases, the predetermined condition may be a threshold number of user query event hits associated with a user ID in the query frequency dict. In this way, the search clustering file may be built upon the search and download activity of regular, or "core" system users (e.g., only users who have over a threshold number of searches may be clustered), rather than the potentially more inefficient, less instructive activity of more casual system users. In some embodiments, the predetermined condition may be stored as part of a configuration or settings file, such as a file within the configuration repository 120 shown in FIG. 1.

At step 284, user clusters may be determined by applying clustering rules to those query structures which satisfy the predetermined condition, the application of the clustering rules resulting in the selection of a substantially optimum set of search vectors and assigning user IDs to clusters defined by the selected search vectors. In other words, the cluster algorithm may process the query structures to determine a number of clusters and assign users (e.g., identifiers for users who have over a threshold number of user query event hits) to each of the defined clusters. The clustering algorithm may be any suitable clustering algorithm known in the art, including without limitation, K-Means algorithms, hierarchical clustering algorithms, lexical clustering, affinity propagation, mean shift, or semantic clustering. Prior to applying the clustering algorithm, coordinate values may also be assigned to the critical labels along all of the search vectors.

Alternatively, the clustering module may assign coordinate values to all of the critical labels along a determined subset of search vectors. For example, recalling that in examples presented herein, the keyword "Barcelona Hotels" mapped closely to the critical labels "Europe" and "Lifestyle". Applying rules or making an initial rough pass with the clustering algorithm, the clustering module may be able to identify certain search vectors, such as "Living Things" or "Product ID" as mapping negligibly to the critical labels "Europe" and "Lifestyle" and avoid performing any calculation to assign coordinate values to the critical labels "Europe" and "Lifestyle" along such negligible search vectors. Skilled artisans will appreciate that there may be a variety of ways to assign coordinate values along critical labels or search vectors.

At step 290, the clustering module completes the application of the clustering algorithm and outputs a search clustering file containing a plurality of clusters of user IDs, each cluster of user IDs associated with a corresponding discriminant search vectors. Note that, according to some embodiments, the search clustering file may also contain the critical labels which the clustering algorithm determined to be most closely mapped to the search vector, as well as query keyword data associated with the user IDs comprising the cluster or other data.

Figure 3:
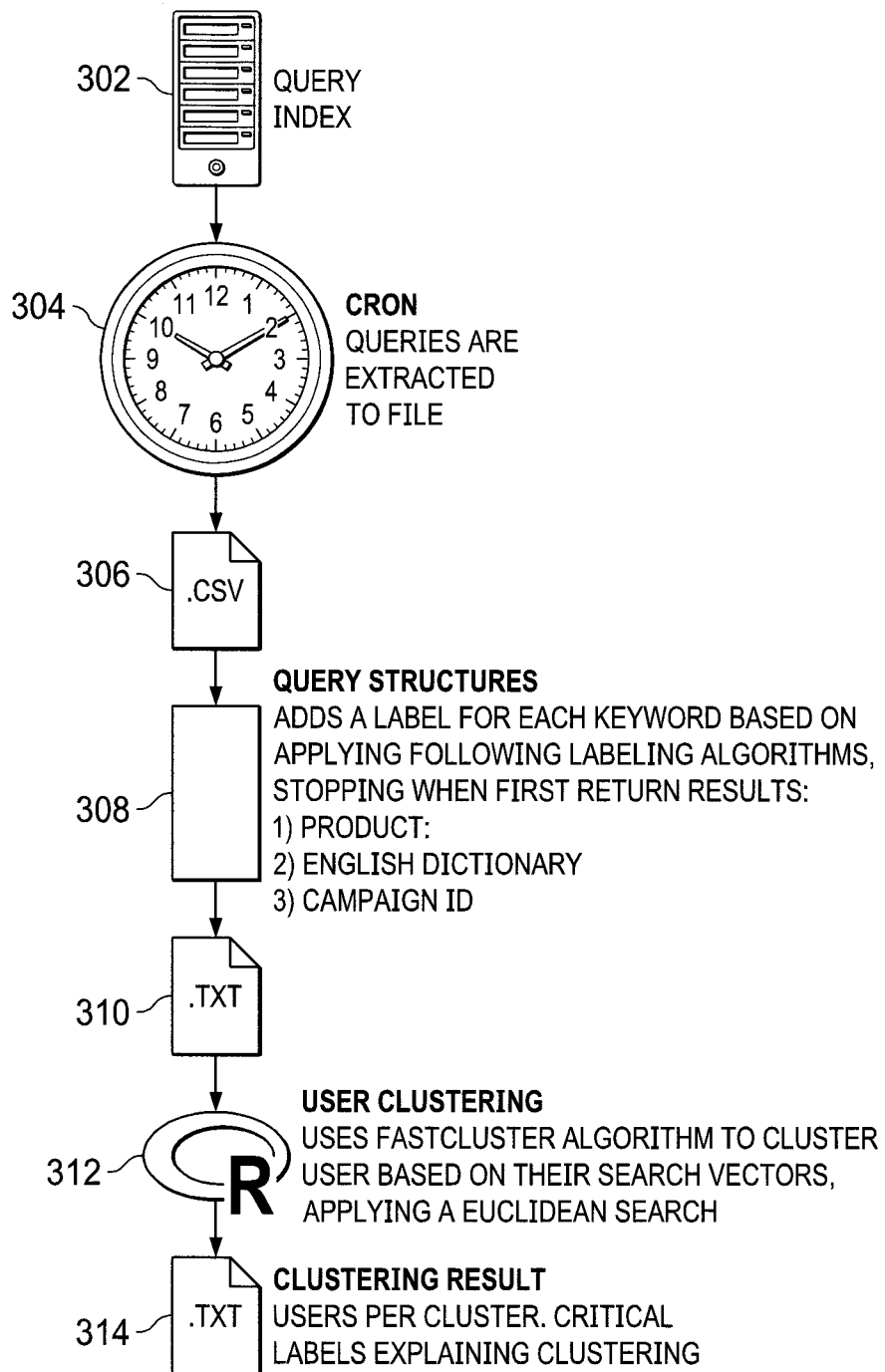
FIG. 3 depicts a diagrammatic representation of an embodiment for generating a search clustering file according to some embodiments.

Turning now to FIG. 3, a diagrammatic representation of one embodiment of an implementation for generating a search clustering file is depicted. More specifically, FIG. 3 depicts an implementation of parts of a search system that may be used in a conjunction with an asset hub of an enterprise scale DAM system of a large corporation.

In this embodiment, user query events are stored in query index 302. Query index 302 may be maintained on an enterprise-class Apache Solr search system. According to this specific embodiment, query index 302 stores, for each user query event, a user ID, any keywords contained in the user query event, and the search results returned by the system in response to the user query event.

In this embodiment, the contents of query index 302 are periodically extracted to a .csv file 306 as part a regularly scheduled operation. For example, the extraction 304 may be performed as part of a Unix-based cron job to generate .csv file 306 at regular intervals.

A query clustering module 308 evaluates the keywords of the queries of user query event contained in .csv file 306 to determine if a label can be determined for the keywords by applying each of three sets of labeling rules in order, stopping when the application of a set of labeling rule returns a hit for the keyword. Note that, in certain embodiments, such as search system 100 shown in FIG. 1, one or more of the labeling rules may utilize dictionaries maintained in dictionary repository 118.

In this example, the first labeling rules utilize an underlying Lucene framework to perform a fast full-text search of a Solr Index representation of products associated with a business group (e.g., a business group of the enterprise) to determine if any of the keywords in the tabulated user query data generate hits in the Solr Index representation. Where a hit occurred, the keyword is assigned one or more critical labels associated with the product generating the hit. Note that, according to embodiments, this Solr Index may be updated using a Protocol Independent Multicast (PIM).

If no keyword hits are generated from the Solr Index representation of the products, second labeling rules may be applied. In this embodiment, the second set of labeling rules compares keywords associated with the user query events against a version of a dictionary of the English language (e.g., as contained in the nltk of Python). In one embodiment, the dictionary may be modified, or otherwise include certain identifiers or terms specific to the enterprise. For example, the English language dictionary may be modified to include exceptions for words corresponding to advertising campaign identifiers used by the enterprise. Words in the English language dictionary may be mapped to critical labels such as: "abstraction", "physical entity," "living thing" and "person" that may be assigned to those keywords by the labeling rules. Here, as with the previous dictionary, if a hit between a keyword in the user query event data and a term in the dictionary occurred, the keyword would be labeled with the critical label(s) specified in the dictionary.

Finally, if no hits occur between keywords contained in the .csv file 306 of user query event data and the Solr Index representation and the English language dictionary, the third labeling rules may compare keywords against a "Campaign ID" dictionary. In this embodiment, the "Campaign ID" dictionary may be the names and code names of an enterprise's advertising and promotional campaigns as generated by a marketing application or the like (e.g., as provided by Marketo Corporation of San Francisco, California).

After applying the query clustering module 308 to evaluate the keywords to determine and critical labels for each query keyword for user query events in .csv file 306, a transform may then be applied on each determine critical label to generate a frequency dictionary whose keys are the determined critical labels and whose values are the number of "hits" associated with each of the critical labels. Thus, each user ID may be associated with a number of query events, critical labels determined for the keywords of those user query events and a count for each of the critical labels.

Further, the query clustering module 308 may use the generated frequency dictionary to apply a filtering function to identify the user IDs who have a threshold number of user query event hits. This determination may involve determining user IDs for users associated with a number of query events equal to or greater than a threshold or user IDs whose keywords generated a threshold number of hits during the critical labeling process. In one embodiment, for example, the threshold may be set to identify user IDs having more than eight user query event (e.g., who submitted more than eight searches) or whose query keywords generated at least eight hits during the critical labeling process. The query clustering module 308 generates query structures 310 as a result of this filtering process. The query structures 310 may associate, for each user ID having a threshold number of user query event hits, the user ID's query event data, and the determined critical labels for each of the user ID's query events. In the embodiment shown in FIG. 3, the query structs may be assembled into a .txt file containing the query structures 310, which is output or stored so that it can be accessed by a user clustering module 312. According to some embodiments, .txt file 310 may also include coordinate values along all, or a determined subset of search vectors, for each of the critical labels contained in .txt file 310.

In this embodiment, user clustering module 312 implements a fastclustering algorithm which identified a substantially optimum number of clusters, and clustered user IDs using a Euclidean search clustering algorithm based on the critical labels and their counts. In this example of the embodiments, the user clustering algorithm determines the optimum number of clusters and assigns users associated with the query structs to appropriate cluster. Such a clustering module may utilize R or Python. The output of the user clustering module 312 is a search clustering file 314. In this case, search clustering file 314 is also a .txt file containing the clusters of user IDs and, for each cluster, the set of critical labels most closely associated with the cluster.

Figure 4:
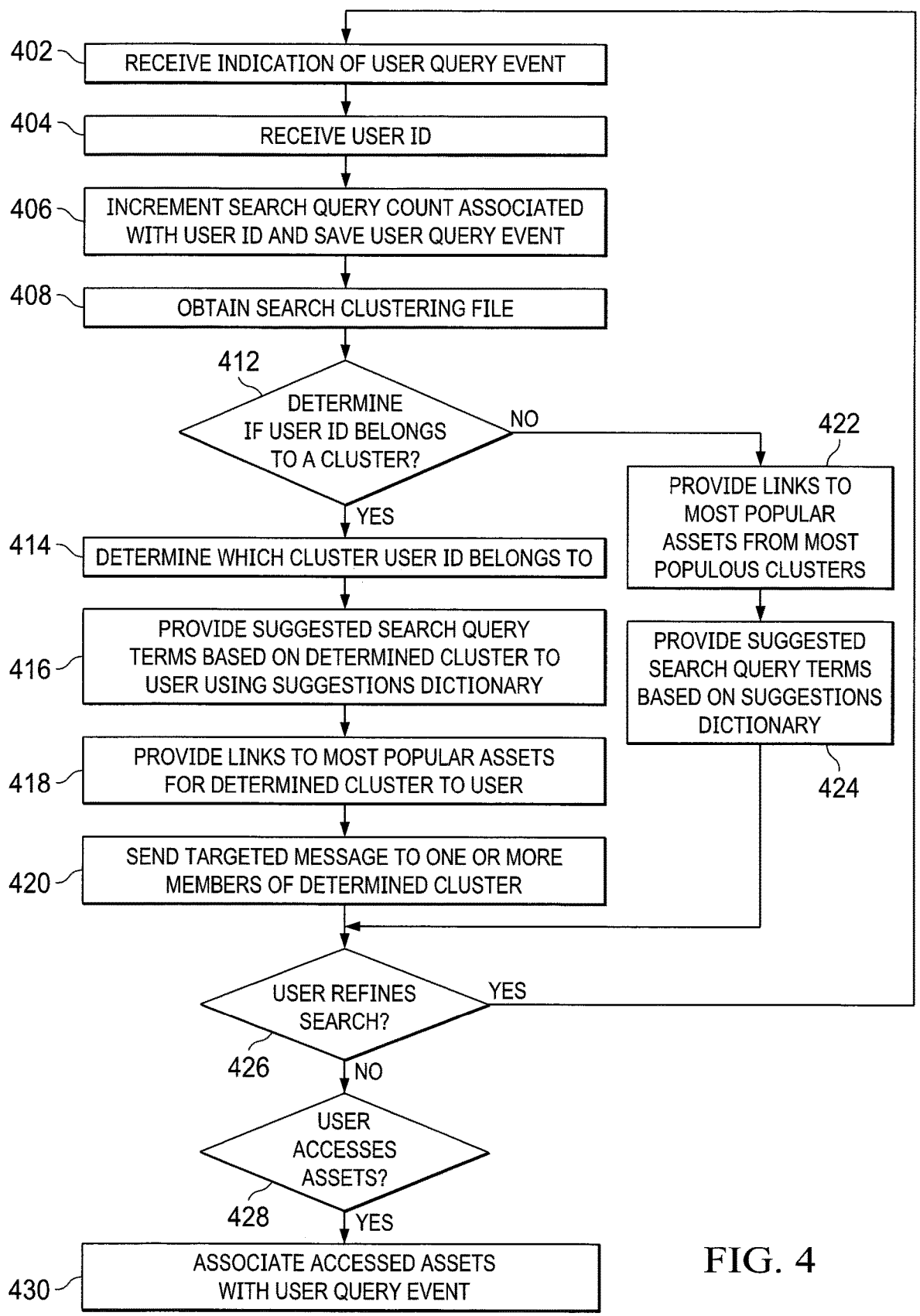
FIG. 4 provides a flow diagram of an embodiment of a method for generating suggestions and messages using a search clustering file.

Moving to FIG. 4, a flow diagram of one embodiment of a method for generating suggestions or a message using a search clustering file that may be employed by embodiments of a search system is depicted. Initially, a search is received from a user accessing an interface of a search system at user's device. Again, this search may be a full or partial search, including one or more keywords or partial keywords. A suggestion module, such as the suggestion module 108 shown in the example of FIG. 1, receives an indication of a user query event for the user's search at the user interface of a client computer. The indication of the user query event at the user interface may, for example, be provided to the suggestion module by a search module (such as search module 102 shown in FIG. 1) when the search query is received from a user (or is in the process of being constructed by the user) at the search module.

More specifically, as reducing the number of search queries or keywords needed to find desired content and assisting with ineffective or unartfully phrased search queries are among the objects of certain embodiments, it will be noted that an indication of a user query event at step 402 may comprise less than a complete search query or may include partial terms, etc. For example, while generating a user query event may include all of the search keywords included by a user (e.g., when the user hits a "search" button) or a semantically meaningful string (e.g., "Barcelon"), an indication of a user query event may, in some cases, be based on less user input or received earlier in the query process, such as when a user positions a mouse pointer on a search bar or begins to enter characters in a search bar. In this way, a suggestion module may be able to provide search suggestions or suggest content in a timely manner (e.g., before the user consumes additional system resources by completing and submitting a search query containing keywords that are unlikely to lead the user to the content actually sought).

Next, at step 404, an index of registered users and user IDs for the search system may be queried to determine whether the received indication of a search query event is associated with a registered user, and if so, whether that user ID is associated with a cluster in a search clustering file. The identification of the user submitting the search may be accomplished as the user may have logged into the search system (or DAM system) or the search request from the user may include identifying information from, for example, a cookie stored on the user's device. Other methodologies for identifying a user may be possible and are fully contemplated herein.

At step 406, if a user ID can be associated with the user generating the user query event, a search query count associated with that user ID may be incremented to reflect an indication of a user query event. In some embodiments, where a search clustering file may be generated and maintained in real-time, this incrementing may comprise regeneration of the search clustering file using, for example, the systems and methods described in the examples shown herein. The query index may also be updated at this time (e.g., to create a new entry in the query index corresponding to the user query event for the search submitted by the user). For example, a new user query event entry may be created in the query index and associated with the user ID for the user and the query terms including the keywords or strings associated with the user query event.

At step 408, the search clustering file may be obtained. As discussed, the search clustering file may include a plurality of clusters. Each cluster is defined by a set of user IDs and, for each cluster, the set of critical labels most closely associated with the cluster. A suggestions dictionary associating search query keywords with clusters may also be obtained. According to some embodiments, a suggestions dictionary may associate a set of critical labels with a cluster and may be built from the search clustering file. Other embodiments are also possible, wherein a suggestion dictionary associates a set of query keywords with a cluster. Note also, that the generation of a suggestion dictionary may also be performed by a module within the search system asynchronously to the reception of user query events and providing related suggestions.

A determination, at step 412, can then be made as to whether the user ID associated with received user query event is in a cluster included in the search clustering file. In the example described with respect to FIG. 4, this determination (step 412) may affect the manner and content of a response to the user query event. If the user ID is associated with a cluster in the search clustering file (Y branch of step 412), at step 414 the suggestion module determines the specific cluster to which the user ID belongs.

After identifying the relevant cluster at step 414, the search module may perform at least one of steps 416, 418 or 420. At step 416, having identified the cluster to which the user ID associated with the indication of a user search query event belongs, a set of suggested search query terms associated with the cluster may be provided to the user through the user interface on the user's machine. Note that, in some embodiments, the presentation of suggested search query terms may take the form of "auto-completing" a started search string with a term from the suggestion dictionary associated with the user ID's cluster. These suggested search terms may, for example, be critical labels or keywords associated with the cluster to which the user was identified as belonging (e.g., which may be obtained from the search clustering file). For example, the critical label that is the most significant dimension for the identified may be provided to the user.

At step 418, having identified the cluster to which the user ID associated with the user query event belongs, the suggestion module accessed the suggestion dictionary which may include identifiers for the most popular managed assets of the system accessed by users of the cluster. According to some embodiments, such a dictionary may be generated by a dictionary module (such as dictionary module 106 shown in the example depicted in FIG. 1) operating in conjunction with a ranked assets module (such as ranked assets module 112 shown in the example depicted in FIG. 1). Again, note that this dictionary or index may, for example, be built asynchronously to the operation of receiving search events and providing suggestions. Accordingly, a list, or direct download links, of one or more of the identified set of the managed assets most frequently downloaded by users of the cluster.

At step 420, a targeted message may be sent to users associated with the other user IDs in the cluster associated with the identified user (e.g., who submitted the search event). For example, using the search clustering file, all the user IDs associated with the same cluster to which the user who submitted the search query belongs may be identified. Contact information associated with these user IDs can be identified using the user index and messages sent to this contact information. In one embodiment, such messaging may be advantageous in cases where a new managed asset of interest (for example a new product announcement) has been added to a managed repository of a system, of which core users belonging to a cluster may not be aware.

In cases where the determination at step 412 indicates that the user query event is from a user who cannot be identified as belonging to a cluster (e.g., whose user ID is not included in a cluster defined by the search clustering file) (N branch of step 412), rather than provide links to the managed assets most frequently downloaded by members of a cluster (such as in step 418), the suggestion module may, instead, poll a suggestion dictionary or ranked assets module to generate a list of the most popular assets overall and return these as suggestions to the user providing the indication of a search query event at step 422. Alternatively or additionally, at step 424, the suggestion module may, instead of providing search terms associated with a specific cluster (such as in step 416), suggest the most popular search terms overall to the querying user or most popular search terms associated with some criteria.

In any event, after determining the determination of suggestions to provide to a user, the user may refine his existing search. Such a refinement of the search may be indicated by the reception of another user query event associated with the same user. If it is determined that the user has refined his query or submitted a new search (Y branch of step 426), the method for determining suggestions may be repeated for the new user query event at step 402. If, at some point, assets are accessed by a user in relation to a search (Y branch of step 428), the identifiers for the accessed assets may be received and stored in association with the user query event in the user query event data or query index at step 430. Identifiers of assets accessed by a user may be returned, for example, by the user interface through which the user is interacting with the search system or content management system.

Attention is now directed to FIG. 5, which depicts an example of the contents of a one embodiment of a search clustering file. In this example, the contents of search clustering file are shown in table 500 (e.g., representative of contents of a .csv file). Skilled artisans will appreciate that other file formats or methods of storing a search clustering file may also be utilized without limitation (e.g., XML, .txt or .sql among others). In this example, the determined search vectors defining clusters are shown as the row headers on the leftmost side of the table 500. Each of the columns represents the state of a cluster at a different point in time. In this particular example, the cluster-defining search vectors include "Campaign" (502), and "Graphics Solutions" (520), which are, in this particular example, also critical labels.

As discussed elsewhere in this disclosure, search vectors and critical labels may in some embodiments become coextensive, wherein suitably discriminant critical labels can be used as search vectors. Alternatively, in other embodiments, the coordinate space of the search vector may be defined differently, wherein a critical label cannot be coextensive with a search vector.

In the example shown in FIG. 5, the search clustering file provides for each cluster, a group of user IDs. In this example, the size of the user ID set for the "Campaign" cluster is shown as "Size" (504) having a value of 156 (512). In other words, there may be 156 users (or user IDs) associated with this cluster. Note also, that according to embodiments, the search clustering file may also include previously calculated values of size.

A search clustering file also identifies a predetermined number of discriminant critical labels associated with the cluster. In this example, the "Campaign" cluster has the ranked critical labels (506, 508 and 510), "Lifestyle" (514), "Abstraction" (516) and "HP Servers" (518). Skilled artisans will appreciate that numerous other embodiments of a search clustering file may be possible, wherein additional information pertaining to the user IDs and critical labels are contained in the search clustering file.

Turning now to FIG. 6, a depiction of example contents of a suggestion dictionary file according to one embodiment is presented. In this example, the contents of suggestion dictionary are shown as a table 600 for clarity and ease of explanation. Skilled artisans will appreciate that the dictionary described herein may be formatted according to any number of suitable data structures, including, without limitation, as a Python dictionary.

In this example, the determined clusters are shown as the row headers on the leftmost side of the table. In this particular example, the clusters include "Campaign" (602), and "Graphics Solutions" (604). For the cluster associated with the "Campaign" search vector 602, the dictionary contains five suggested keywords: "Tabo" 616, "Pochacco" 618, "Bosco" 620, "Kowalski" 622 and "Reacher" 624 associated with marketing campaigns. Note also, that in this example, the suggested keywords in the suggestion dictionary are ranked within the file, as "Sug 1" 606, "Sug 2" 608, "Sug 3" 610, "Sug 4" 612 and "Sug 5" 614. Note that, according to some embodiments, the ranking of the suggested keywords may be assigned based on the frequency with which these search terms are received by a search system (e.g., in association with users identified with the cluster). Alternatively, the ranking of keywords may be based at least in part on an association between the keyword and the frequency with which searches using that keyword lead to asset downloads. In other embodiments, the ranking of keywords within suggestion dictionary file may determine which keywords are suggested for users having user IDs that are not associated with a cluster in the search clustering file.

Attention is now directed to FIG. 7, which provides a depiction of another suggestion dictionary file according to some embodiments. Note that, for ease of explanation of this particular, the suggestion dictionary file is represented in table 700. Skilled artisans will appreciate that the data depicted herein may be stored and presented according to any number of suitable formats.

In this example, the determined search vectors defining clusters are shown as the row headers on the leftmost side of the table. In this particular example, the clusters include "Product & Product In Use" (702), and "LifeStyle" (704). For each cluster in the suggestion dictionary file, a list of keywords for suggestion is maintained. In this example, the keywords associated with "Product & Product In Use" cluster 702 include "h7000" (706) and "6830" (708).

According to some embodiments, the keywords contained in suggestion dictionary 700 may be presented as "auto-completions" to a search string initiated by a user at a user interface. For example, a user may enter the characters "h7," and based on a determination that the user's user ID belongs to the "Product & Product in Use" cluster 702, the system may present the text "h7000" as a suggested keyword for the user. Other applications for, and modes of suggestion using the keywords contained in suggestion dictionary 700 will be apparent from a review of the embodiments disclosed herein.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, random access memory (RAM), and hard drive (HD) are computer memories for storing computer-executable instructions executable by the central processing unit (CPU) or capable of being compiled or interpreted to be executable by the CPU. Suitable computer-executable instructions may reside on a computer readable medium (e.g., ROM, RAM, or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as RAMs, ROMs, HDs, data cartridges, direct access storage device arrays, magnetic tapes, floppy diskettes, flash memory drives, optical data storage devices, compact-disc ROMs (CD-ROMs), and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, Python, Ruby, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include RAMs, ROMs, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A method, comprising:
accessing user event data comprising a plurality of user events associated with user identifiers (IDs), the user events including a plurality of user query events, where each user query event is associated with the user ID of a user associated with the user query event and one or more keywords associated with the user query event;
generating a search clustering file defining a plurality of user clusters, each user cluster comprising a set of user IDs associated with a search vector defined by one or more critical labels and defined with respect to a coordinate space defined for a data element related to searchable assets, by:
receiving an activity associated with a user;
accessing the search clustering file based on the activity of the user to associate the user with a user cluster of the plurality of user clusters of the search clustering file; and
providing the user a suggested search query term associated with the user cluster associated with the user, or
providing to the user a suggestion of an asset available for access, wherein the asset associated with the user cluster associated with the user.

2. The method of claim 1, wherein each user event is associated with a concept and the search vector is a conceptual vector.

3. The method of claim 2, the one or more labels of the search vector are concept labels.

4. The method of claim 3, wherein the plurality of user clusters are determined based on one or more critical labels associated with the user event data.

5. The method of claim 3, wherein the search vectors are non-orthogonal.

6. The method of claim 1, wherein the user is associated with a user cluster based on a user ID associated with the user.

7. The method of claim 1, wherein the activity is access to an asset or a search associated with the user.

8. A non-transitory computer readable medium, comprising instructions for:
accessing user event data comprising a plurality of user events associated with user identifiers (IDs), the user events including a plurality of user query events, where each user query event is associated with the user ID of a user associated with the user query event and one or more keywords associated with the user query event;
generating a search clustering file defining a plurality of user clusters, each user cluster comprising a set of user IDs associated with a search vector defined by one or more critical labels and defined with respect to a coordinate space defined for a data element related to searchable assets, by:
receiving an activity associated with a user;
accessing the search clustering file based on the activity of the user to associate the user with a user cluster of the plurality of user clusters of the search clustering file; and
providing the user a suggested search query term associated with the user cluster associated with the user, or
providing to the user a suggestion of an asset available for access, wherein the asset associated with the user cluster associated with the user.

9. The non-transitory computer readable medium of claim 8, wherein each user event is associated with a concept and the search vector is a conceptual vector.

10. The non-transitory computer readable medium of claim 8, the one or more labels of the search vector are concept labels.

11. The non-transitory computer readable medium of claim 10, wherein the plurality of user clusters are determined based on one or more critical labels associated with the user event data.

12. The non-transitory computer readable medium of claim 10, wherein the search vectors are non-orthogonal.

13. The non-transitory computer readable medium of claim 8, wherein the user is associated with a user cluster based on a user ID associated with the user.

14. The non-transitory computer readable medium of claim 8, wherein the activity is access to an asset or a search associated with the user.

15. A search system, comprising:
a processor;
a non-transitory computer readable medium, comprising instructions for:
accessing user event data comprising a plurality of user events associated with user identifiers (IDs), the user events including a plurality of user query events, where each user query event is associated with the user ID of a user associated with the user query event and one or more keywords associated with the user query event;
generating a search clustering file defining a plurality of user clusters, each user cluster comprising a set of user IDs associated with a search vector defined by one or more critical labels and defined with respect to a coordinate space defined for a data element related to searchable assets, by:
receiving an activity associated with a user;
accessing the search clustering file based on the activity of the user to associate the user with a user cluster of the plurality of user clusters of the search clustering file; and
providing the user a suggested search query term associated with the user cluster associated with the user, or
providing to the user a suggestion of an asset available for access, wherein the asset associated with the user cluster associated with the user.

16. The search system of claim 15, wherein each user event is associated with a concept and the search vector is a conceptual vector.

17. The search system of claim 16, the one or more labels of the search vector are concept labels.

18. The search system of claim 17, wherein the plurality of user clusters are determined based on one or more critical labels associated with the user event data.

19. The search system of claim 17, wherein the search vectors are non-orthogonal.

20. The search system of claim 15, wherein the user is associated with a user cluster based on a user ID associated with the user.

21. The search system of claim 15, wherein the activity is access to an asset or a search associated with the user.

* * * * *